(12) United States Patent
Kim et al.

(10) Patent No.: US 11,893,712 B2
(45) Date of Patent: Feb. 6, 2024

(54) ELECTRONIC DEVICE AND CONTROL METHOD THEREOF

(71) Applicant: SAMSUNG ELECTRONICS CO., LTD., Suwon-si (KR)

(72) Inventors: Beomjoon Kim, Suwon-si (KR); Minjae Lee, Suwon-si (KR); Youngseok Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 842 days.

(21) Appl. No.: 16/924,354

(22) Filed: Jul. 9, 2020

(65) Prior Publication Data

US 2021/0012465 A1 Jan. 14, 2021

(30) Foreign Application Priority Data

Jul. 11, 2019 (KR) .................. 10-2019-0083789

(51) Int. Cl.
*G06T 5/00* (2006.01)
*G06T 5/50* (2006.01)
*G06T 7/40* (2017.01)

(52) U.S. Cl.
CPC ............. *G06T 5/002* (2013.01); *G06T 5/50* (2013.01); *G06T 7/40* (2013.01); *G06T 2207/20182* (2013.01)

(58) Field of Classification Search
CPC .. G06T 5/002; G06T 5/50; G06T 7/40; G06T 2207/20182; G06T 2207/30168; G06T 7/0002; G06T 3/40; H04N 5/21
See application file for complete search history.

(56) References Cited

U.S. PATENT DOCUMENTS 8,208,682 B2 6/2012 Park
2009/0034875 A1* 2/2009 Park .................. G06T 7/42
382/280

FOREIGN PATENT DOCUMENTS

| JP | 2002-374502 A | 12/2002 |
|---|---|---|
| KR | 10-0759141 B1 | 9/2007 |
| KR | 10-2010-0071400 A | 6/2010 |
| KR | 10-1156117 B1 | 7/2012 |
| KR | 10-2015-0069343 A | 6/2015 |

* cited by examiner

*Primary Examiner* — Mekonen T Bekele
(74) *Attorney, Agent, or Firm* — Sughrue Mion, PLLC

(57) ABSTRACT

An electronic device is provided. The electronic device includes an input interface and a processor that performs noise removal processing on an image input through the input interface, obtains first information on a first texture block among a plurality of first pixel blocks included in the input image, obtains second information on a second texture block among a plurality of second pixel blocks included in the noise-removed image, obtains third information on maximum energy amount among energy amount of each of the plurality of second pixel blocks, and identifies whether the input image is an upscaled image based on the first, second and third information.

14 Claims, 12 Drawing Sheets

ELECTRONIC DEVICE AND CONTROL METHOD THEREOF

CROSS-REFERENCE TO RELATED APPLICATION(S)

This application is based on and claims priority under 35 U.S.C. § 119 to Korean Patent Application No. 10-2019-0083789, filed on Jul. 11, 2019, in the Korean Intellectual Property Office, the disclosure of which is incorporated by reference herein in its entirety.

BACKGROUND OF THE DISCLOSURE

Field

Apparatuses and methods consistent with the disclosure relate to an electronic device and a control method thereof, and more particularly, to an electronic device for identifying an upscaled image, and a control method thereof.

Description of the Related Art

In accordance with the development of electronic technology, various types of electronic devices have been developed and distributed in various places, such as homes, offices, public places and the like.

Recently, high-definition display panels, such as 4K (3840×2160) ultra high definition (UHD) televisions (TVs) have been released and widely distributed. However, there is still a need for even more a high-resolution content. Accordingly, an 8K (7680×4320) UHD image may be generated from standard definition (SD), high definition (HD) or 4K UHD image through various upscaling methods such as scaling using an interpolation filter for a low-resolution content, up-converting, etc. Here, an image converted from an HD-level to a UHD-level may have a different type of image feature from an original UHD image due to a filter application and the like. For instance, the image converted from the HD-level to the UHD-level may have more severe artifacts than the original UHD image. These severe artifact may negatively affect a viewing experience of a user watching the image through an electronic device, and thus a proper image processing may be required.

SUMMARY OF THE DISCLOSURE

Embodiments of the disclosure may overcome the above disadvantages and other disadvantages not described above. Also, the disclosure is not required to overcome the disadvantages described above, and an embodiment of the disclosure may not overcome any of the problems described above.

The disclosure provides an electronic device for identifying whether an input image is an upscaled image, and a control method thereof.

According to an aspect of the disclosure, there is provided an electronic device comprising: an input interface comprising a circuit; and a processor configured to: perform noise removal processing on an image input through the input interface, obtain first information on a first texture block, among a plurality of first pixel blocks included in the input image, obtain second information on a second texture block, among a plurality of second pixel blocks included in the noise-removed image, obtain third information on maximum energy amount, among energy amount of each of the plurality of second pixel blocks, and identify whether the input image is an upscaled image based on the first information, the second information and the third information.

According to another aspect of the disclosure, there is provided a control method of an electronic device, comprising: performing noise removal processing on an input image; obtaining first information on a first texture block among a plurality of first pixel blocks included in the input image; obtaining second information on a second texture block among a plurality of second pixel blocks included in the noise-removed image; obtaining third information on maximum energy amount among energy amount of each of the plurality of second pixel blocks; and identifying whether the input image is an upscaled image based on the first information, the second information and the third information.

According to various embodiments of the disclosure as described above, it is possible to identify whether the input image is the upscaled image, and perform image processing suitable for the image based on an identification result, thereby providing a user with an improved image with optimal image quality.

Additional and/or other aspects and advantages of the disclosure are set forth in part in the description which follows and, in part, are obvious from the description, or may be learned by practice of the disclosure.

BRIEF DESCRIPTION OF THE DRAWING FIGURES

The above and/or other aspects of the disclosure are more apparent by describing certain embodiments of the disclosure with reference to the accompanying drawings, in which.

DETAILED DESCRIPTION OF THE EMBODIMENTS

Figure 1:
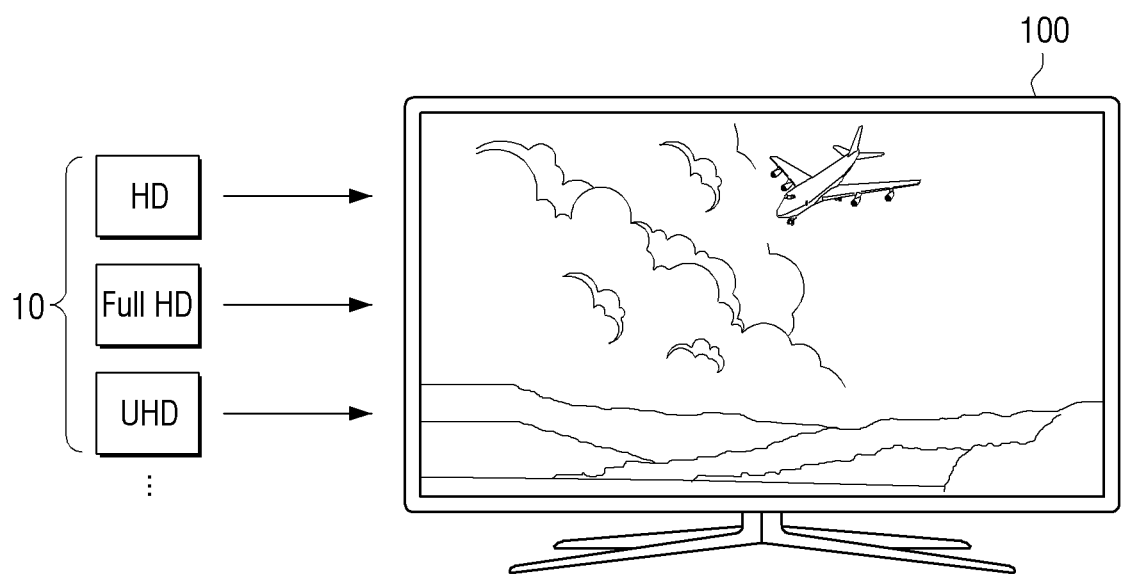
FIG. 1 is a view for describing an implementation example of an electronic device according to an embodiment of the disclosure.

Hereinafter, the disclosure is described in detail with reference to the accompanying drawings.

General terms that are currently widely used were selected as terms used in embodiments of the disclosure in consideration of functions in the disclosure, but may be changed depending on the intention of those skilled in the art or a judicial precedent, the emergence of a new technique and the like. In addition, in a specific case, terms arbitrarily chosen by an applicant may exist. In this case, the meanings of such terms are mentioned in detail in corresponding description portions of the disclosure. Therefore, the terms used in the embodiments of the disclosure need to be defined based on the meanings of the terms and the contents throughout the disclosure rather than simple names of the terms.

In the disclosure, expression such as, 'have', 'may have', 'include', 'may include' or the like, indicates existence of a corresponding feature (for example, a numerical value, a function, an operation, a component such as a part or the like), and does not exclude existence of an additional feature.

In the specification, 'A or/and B' may indicate either 'A or B', or 'both of A and B'.

Expressions 'first', 'second' or the like, used in the disclosure may indicate various components regardless of a sequence and/or importance of the components. These expressions are used only in order to distinguish one component from the other components, and do not limit the corresponding components.

In case that any component (for example, a first component) is mentioned to be (operatively or communicatively) coupled with/to or connected to another component (for example, a second component), it is to be understood that the any component is directly coupled to the another component or may be coupled to the another component through other component (for example, a third component).

Singular forms used herein are intended to include plural forms unless explicitly indicated otherwise. It is further understood that a term 'include' or 'formed of' used in the specification specifies the presence of features, numerals, steps, operations, components, parts or combinations thereof, which is mentioned in the specification, and does not preclude the presence or addition of one or more other features, numerals, steps, operations, components, parts or combinations thereof.

In the embodiments, a 'module' or a '~er/~or' may perform at least one function or operation, and be implemented by hardware or software or be implemented by a combination of hardware and software. In addition, a plurality of 'modules' or a plurality of '~ers/~ors' may be integrated in at least one module and be implemented by at least one processor (not illustrated) except for a 'module' or a '~er/or' that needs to be implemented by a specific hardware.

In the specification, such a term as 'user' may refer to a person who uses an electronic device or a device (e.g., an artificial intelligence electronic device) which uses an electronic device.

Hereinafter, embodiments of the disclosure are described in more detail with reference to the accompanying drawings.

FIG. 1 is a view for describing an implementation example of an electronic device according to an embodiment of the disclosure.

An electronic device 100 may be implemented as a television (TV) as illustrated in FIG. 1, but is not limited thereto. The electronic device 100 may be applied to any device having an image processing function and/or a display function without limitation, such as a smartphone, a tablet personal computer (PC), a laptop PC, a head mounted display (HMD), a near eye display (NED), a large format display (LFD), a digital signage, a digital information display (DID), a video wall, a projector display, a camera, a camcorder, a printer, etc.

The electronic device 100 may receive images of various resolutions or images of various compressed forms. For example, the electronic device 100 may receive any one image 10 of standard definition (SD), high definition (HD), full HD and ultra HD images. In addition, the electronic device 100 may receive the image 10 in a compressed form with a moving picture experts group (MPEG such as MP2, MP4, MP7, etc.), an advanced image coding (AVC), H.264, a high efficiency image codec (HEVC), etc.

According to an embodiment, even though the electronic device 100 is implemented as a UHD TV, availability of a UHD content may be limited. Therefore, in many cases, an image of such as standard definition (SD), high definition (HD), full HD or the like (hereinafter referred to as a low-resolution image) may be input. In this case, the electronic device 100 may enlarge and display the input low-resolution image as a UHD image (hereinafter referred to as a high-resolution image). In another example, the electronic device 100 may receive a UHD image (hereinafter, a high-resolution image) and display the image without additional enlargement of the high-resolution image.

The electronic device 100 according to an embodiment of the disclosure may identify whether the input image 10 is a high-resolution image obtained by enlarging or upscaling a low-resolution image. For example, the input image 10 may be an image obtained by upscaling a low-resolution original image to have a high-resolution and adding high-resolution noise. The electronic device 100 according to an embodiment may perform different image processing on the image by identifying whether the input image 10 is an image converted from a low-resolution to a high-resolution or a high-resolution original image. For example, in case that the input image 10 is the low-resolution original image converted to have a high-resolution (hereinafter, an upscaled image), the electronic device 100 may improve image quality by applying a first image processing method to the input image 10. For example, the electronic device 100 may increase noise removal intensity and apply the increased noise removal intensity to the input image 10 or perform edge enhancement processing on the input image 10.

According to another example, in case that the input image 10 is the high-resolution original image, the electronic device 100 may improve the image quality by applying a second image processing method to the input image 10. For example, the electronic device 100 may decrease noise removal intensity and apply the decreased noise removal intensity to the input image 10 or perform texture enhancement processing on the input image 10.

Hereinafter, the description may illustrate various embodiments of the electronic device 100 identifying whether the input image 10 is an image converted from the low-resolution original image to the high-resolution image, as described above.

Figure 2:
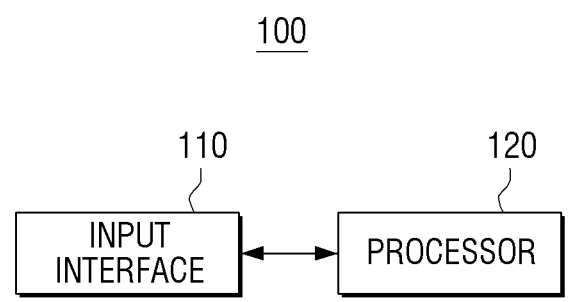
FIG. 2 is a block diagram illustrating a configuration of the electronic device according to an embodiment of the disclosure.

FIG. 2 is a block diagram illustrating a configuration of the electronic device according to an embodiment of the disclosure.

According to FIG. 2, the electronic device 100 may include an input interface 110 and a processor 120.

The input interface 110 may comprise a circuit. The input interface 110 may receive various types of contents, for example, an image signal. For example, the input interface 110 may receive the image signal from an external device (e.g., source device), an external storage medium (e.g., universal serial bus (USB)), an external server (e.g., web hard) or the like by a streaming or downloading method through a communication manner such as an access point (AP) based wireless fidelity (Wi-Fi, i.e. wireless local area network (LAN)), a Bluetooth, a zigbee, a wired/wireless local area network (LAN), a wide area network (WAN), an Ethernet, a long term evolution (LTE), a 5th-generation mobile communications (5G), an IEEE 1394, a high definition multimedia interface (HDMI), a mobile high-definition link (MHL), a USB, a display port (DP), a thunderbolt, an image graphics array (VGA) port, a red-green-blue (RGB) port, a D-subminiature (D-SUB), a digital visual interface (DVI), etc. In particular, the 5G communication system uses an ultra-high frequency band (e.g., a millimeter-wave (mmWave) frequency band such as 26, 28, 38, 60 GHz band, etc). Therefore, the electronic device 100 may receive or transmit a 4K or 8K UHD image in a streaming environment through the 5G communication manner.

Here, the image signal may be a digital signal, but is not limited thereto.

The processor 120 may control an overall operation of the electronic device 100.

According to an embodiment, the processor 120 may be implemented as a digital signal processor (DSP) processing a digital image signal, a microprocessor, an artificial intelligence processor (AI) or a time controller (T-CON). However, the processor 120 is not limited thereto, but may include one or more of a central processing unit (CPU), a micro controller unit (MCU), a micro processing unit (MPU), a controller, an application processor (AP), a communication processor (CP), an ARM processor, or may be defined by these terms. In addition, the processor 120 may be implemented in a system-on-chip (SoC) or a large scale integration (LSI), in which a processing algorithm is embedded, or may be implemented in a field programmable gate array (FPGA) form.

The processor 120 according to an embodiment of the disclosure may perform noise removal processing (or noise reduction processing) on the image input through the input interface 110.

In general, noise may be added to the image in processes of compressing, transmitting and receiving the image. The electronic device 100 according to an embodiment may not only improve image quality of the input image 10 by performing the noise removal processing on the input image 10, but also increase other image processing effects such as scaling, feature extraction, resolution processing, etc.

The processor 120 according to an embodiment of the disclosure may perform the noise removal processing on the input image 10 based on various methods. For example, the processor 120 may perform the noise removal processing based on a method using non-local filtering and self-similarity. For instance, when it is assumed that another region similar to a certain region is included in the input image 10, the processor 120 may measure similarity with respect to other regions in the input image 10 and then perform noise removal processing based on a pixel region having a high similarity.

For example, it may be assumed that the processor 120 obtains a pixel block of a predetermined size in the image as a current pixel block, and pixel blocks similar to the current pixel block exist in the input image 10. In this case, the processor 120 may collect the pixel blocks similar to the current pixel block in the input image 10. According to an embodiment, similar components may be identified as structure components and dissimilar components may be identified as noise components. That is, the processor 120 may remove noise in the image by keeping signals having high similarity among a plurality of pixel blocks and removing signals having low similarity. Meanwhile, this example is only one embodiment of a noise removal processing method, and the disclosure is not limited thereto. According to another example, the processor 120 may effectively remove noise by performing low pass filtering on the input image 10 and minimizing blur in the input image 10. According to another example, the electronic device 100 may remove noticeable noise by applying a smoothing filter such as a Gaussian filter to the input image 10, a guided filter filtering the input image 10 compared to a predetermined guidance image, and the like.

Figure 3A:
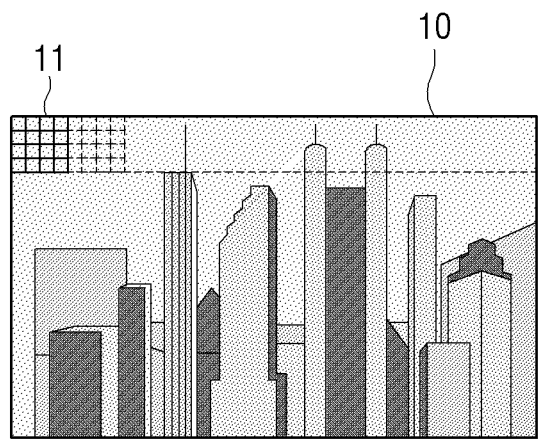
FIG. 3A is a view for describing an input image according to an embodiment of the disclosure.

Subsequently, the processor 120 may obtain first information on a texture block among a plurality of first pixel blocks included in the input image 10 and second information on a texture block among a plurality of second pixel blocks included in the noise-removed image. According to an embodiment, the processor 120 may obtain the first information on the texture block among the plurality of first pixel blocks included in the input image 10 prior to noise removal. FIG. 3A is a view for describing an input image according to an embodiment of the disclosure.

Referring to FIG. 3A, the processor 120 according to an embodiment of the disclosure may identify the texture block among a plurality of first pixel blocks 11 included in the input image 10. Here, the pixel block may refer to a set of adjacent pixels including at least one pixel and having a predetermined size. For example, the pixel block may be a set of pixels including a total of 16 pixels and having a 4×4 size. This size is only an example, and the pixel block may be set to have various sizes.

The processor 120 according to an embodiment may convert the input image 10 to a first frequency domain signal. For example, the processor 120 may convert the input image 10 to the first frequency domain signal by applying, to the input image 10, a discrete fourier transform (DFT), a fast fourier transform (FFT), a discrete cosine transform (DCT), a wavelet transform, etc.

Subsequently, the processor 120 may identify energy information for each of the plurality of first pixel blocks 11 in the first frequency domain signal. For example, the processor 120 may identify total energy amount of each pixel block, and high-frequency energy amount and low-frequency energy amount in the pixel block. Here, the processor 120 may identify a predetermined frequency band obtained as the high-frequency energy amount, and may identify remaining energy amount excluding the high-frequency energy amount from the total energy amount as the low-frequency energy amount. According to an embodiment, the predetermined frequency band may be experimentally obtained.

Subsequently, the processor 120 may identify whether a corresponding pixel block is the texture block based on a ratio of the high-frequency energy amount and the low-frequency energy amount of each pixel block. For example, in case that a value of the high-frequency energy amount/low-frequency energy amount of the pixel block is equal to or more than a specific value, the processor 120 may identify the corresponding pixel block as the texture block. According to another example, in case that the value of the high-frequency energy amount/low-frequency energy amount of the pixel block is less than the specific value, the processor 120 may identify the corresponding pixel block as a smooth block. According to an embodiment, the specific value is an experimentally obtained threshold value.

The processor 120 according to an embodiment of the disclosure may obtain the first information by identifying whether each of the plurality of first pixel blocks 11 included in the input image 10 corresponds to the texture block. Meanwhile, the above-described embodiment is only an embodiment, and the processor 120 may identify whether the corresponding pixel block corresponds to the texture block using various methods. For example, the processor 120 may identify whether the corresponding pixel block corresponds to the texture block by applying the first pixel block 11 to a learning network model. Here, the learning network model may be a machine-learning model or a deep-learning model based on a plurality of sample images.

Figure 3B:
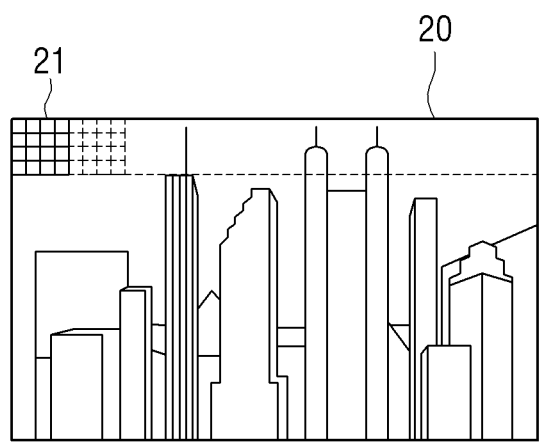
FIG. 3B is a view for describing a noise-removed image according to an embodiment of the disclosure.

FIG. 3B is a view for describing a noise-removed image according to an embodiment of the disclosure.

As described above, the processor 120 may obtain a noise-removed image 20 by performing the noise removal processing on the input image 10.

Subsequently, the processor 120 may obtain the second information on the texture block among a plurality of second pixel blocks 21 included in the noise-removed image 20. For example, the processor 120 may convert the noise-removed image 20 to a second frequency domain signal. For example, the processor 120 may convert the noise-removed image 20 to the second frequency domain signal by applying, to the noise-removed image 20, the discrete fourier transform (DFT), the fast fourier transform (FFT), the discrete cosine transform (DCT), the wavelet transform, etc.

Subsequently, the processor 120 may identify energy information for each of the plurality of second pixel blocks 21 in the second frequency domain signal. For example, the processor 120 may identify total energy amount of each pixel block 21, and high-frequency energy amount and low-frequency energy amount in the pixel block. Here, the processor 120 may identify a predetermined frequency band obtained as the high-frequency energy amount, and may identify remaining energy amount excluding the high-frequency energy amount from the total energy amount as the low-frequency energy amount. For example, the processor 120 may obtain the high-frequency energy amount by summing up energy amount of a frequency bands each having a value equal to or more than a threshold value in the pixel block 21. According to an embodiment, the predetermined frequency band may be experimentally obtained Subsequently, the processor 120 may identify whether a corresponding pixel block is the texture block based on a ratio of the high-frequency energy amount and the low-frequency energy amount of each pixel block. For example, in case that a value of the high-frequency energy amount/low-frequency energy amount of the pixel block is equal to or more than a specific value, the processor 120 may identify the corresponding pixel block as the texture block. In case that the high-frequency energy amount is more than the low-frequency energy amount in the pixel block, the corresponding pixel block may be the texture block. According to another example, in case that the value of the high-frequency energy amount/low-frequency energy amount of the pixel block is less than the specific value, the processor 120 may identify the corresponding pixel block as the smooth block. According to an embodiment, the specific value is an experimentally obtained threshold value.

In yet another example, the processor 120 may identify whether the corresponding pixel block is the texture block based on whether the high-frequency energy amount of the pixel block is equal to or more than the threshold value.

The processor 120 according to an embodiment of the disclosure may obtain the second information by identifying whether each of the plurality of second pixel blocks 21 included in the noise-removed image 20 corresponds to the texture block.

Figure 4:
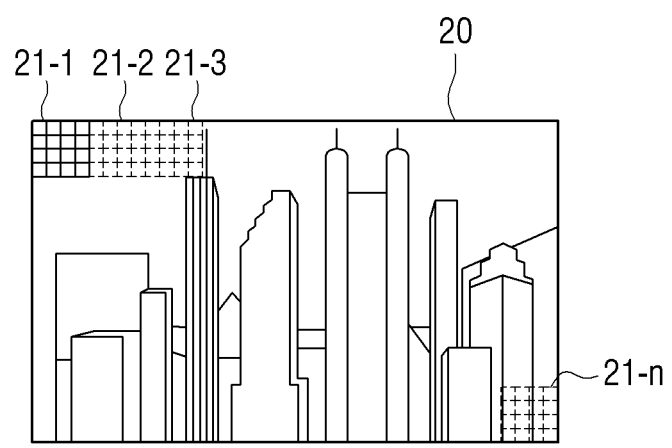
FIG. 4 is a view for describing a frequency domain according to an embodiment of the disclosure.

Referring to FIG. 2, the processor 120 according to an embodiment of the disclosure may obtain third information on maximum energy amount among energy amount of each of the plurality of second pixel blocks. FIG. 4 is a view for describing a frequency domain according to an embodiment of the disclosure.

As described above, the processor 120 according to an embodiment of the disclosure may classify the noise-removed image 20 into a plurality of second pixel blocks 21-1, 21-2, . . . and 21-n and having the 4×4 size, and perform frequency conversion (e.g., a discrete cosine transform (DCT)) for each of the plurality of second pixel blocks 21-1, 21-2, . . . and 21-n. For example, the processor 120 may perform 4×4 DCT or 8×8 DCT. Subsequently, the processor 120 may obtain energy amount corresponding to each of the plurality of second pixel blocks 21-1, 21-2, . . . and 21-n based on a DCT coefficient value obtained by performing the DCT.

Referring to FIG. 4, the processor 120 may obtain energy amount corresponding to the first block 21-1, among the plurality of second pixel blocks 21-1, 21-2, . . . and 21-n, by summing up the energy amount of frequency bands, each having a value equal to or more than the threshold value in the first block 21-1. Subsequently, the processor 120 may obtain energy amount corresponding to the second block 21-2.

The processor 120 according to an embodiment may obtain the third information on the maximum energy amount among the energy amount corresponding to each of the first block 21-1 to the n-th block 21-n.

Referring to FIG. 2, the processor 120 according to an embodiment of the disclosure may identify whether the input image 10 is the upscaled image based on the first, second and third information.

For example, the processor 120 may obtain first ratio information on the texture block among the plurality of first pixel blocks included in the input image 10 based on the first information. Subsequently, the processor 120 may obtain second ratio information on the texture block among the plurality of second pixel blocks included in the noise-removed image 20 based on the second information.

Figure 5:
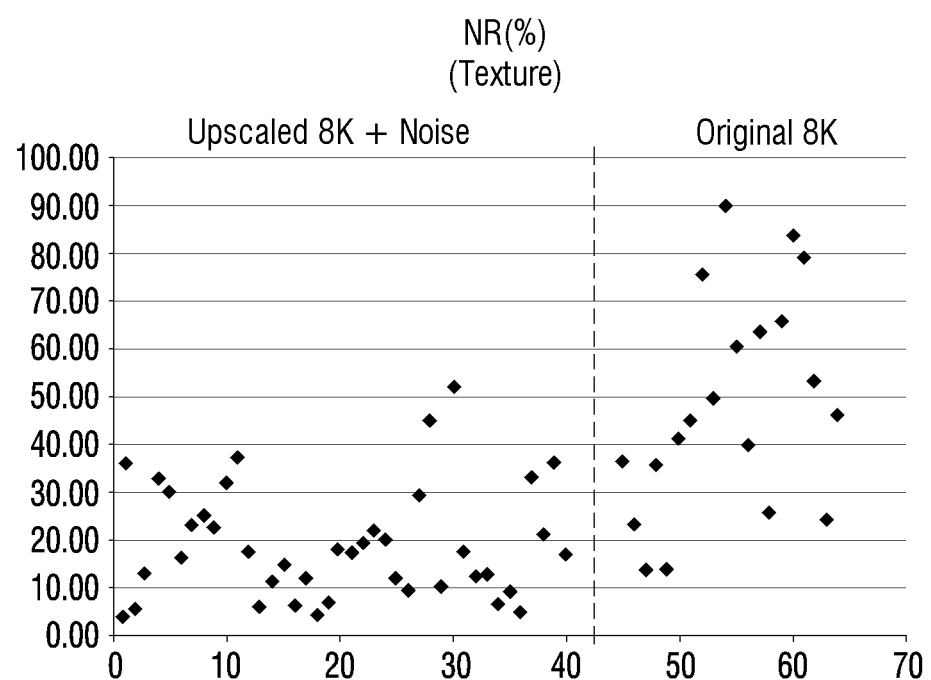
FIG. 5 is a diagram for describing ratio information on a texture block according to an embodiment of the disclosure.

Here, the first ratio information may indicate (the number of the texture blocks)/(the number of the plurality of first pixel blocks). Referring to FIG. 4, the second ratio information may indicate (the number of the texture blocks among the first block to the n-th block)/(n). FIG. 5 is a diagram for describing ratio information on a texture block according to an embodiment of the disclosure.

Referring to FIG. 5, the noise-removed image 20, which is obtained by performing the noise removal processing on the upscaled input image 10 obtained by upscaling the low-resolution image and then adding high-resolution noise, may have a lower texture block ratio, i.e. the lower second ratio information. In general, the noise-removed image 20 obtained based on the upscaled input image 10 may have a texture block ratio of less than 50%.

To the contrary, the noise-removed image 20 obtained by performing the noise removal processing on the high-resolution original input image 10 may have a higher texture block ratio, i.e. the higher second ratio information. The noise-removed image 20 obtained based on the high-resolution original input image 10 may often have a texture block ratio of 50% or more. Accordingly, the processor 120 according to an embodiment of the disclosure may identify whether the input image 10 is the upscaled image based on the second ratio information.

In addition, the processor 120 according to an embodiment of the disclosure may identify whether the input image 10 is the upscaled image based on a difference between the first and second ratio information.

Figure 6:
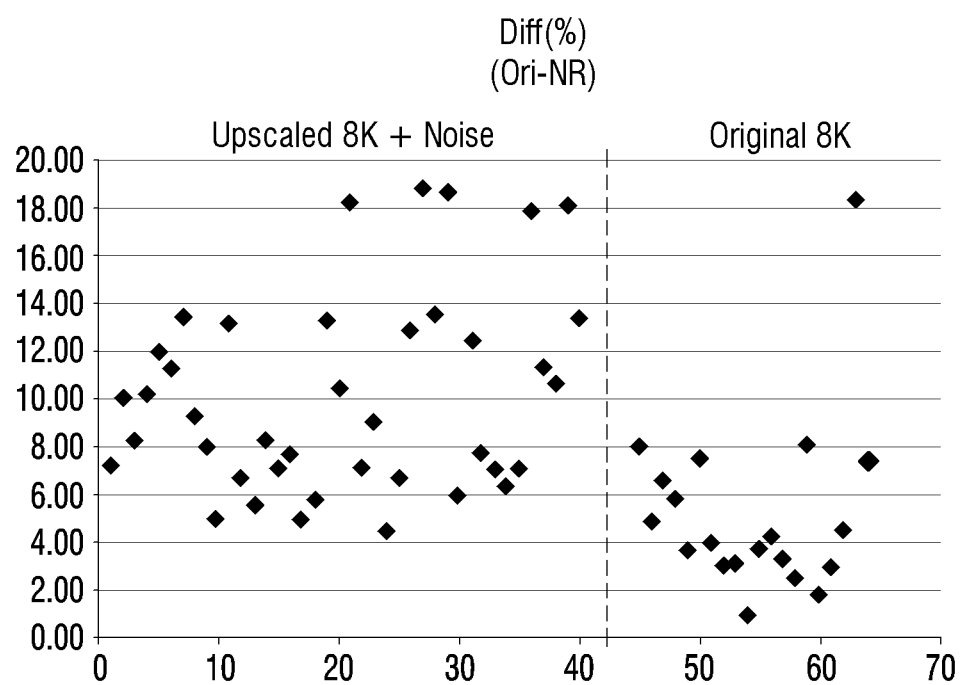
FIG. 6 is a diagram for describing first and second ratio information on the texture block according to an embodiment of the disclosure.

FIG. 6 is a diagram for describing first and second ratio information on the texture block according to an embodiment of the disclosure.

The processor 120 according to an embodiment may identify whether the corresponding input image 10 is the upscaled image based on the difference between the first ratio information indicating a ratio of the texture block included in the input image 10 and the second ratio information indicating a ratio of the texture block included in the noise-removed image 20.

Referring to FIG. 6, the upscaled image may often have a difference of 10% or more in the ratio of the texture block before and after the noise removal processing. To the contrary, the high-resolution original image may more often have a difference less than 10% in the ratio of texture block before and after the noise removal processing.

The processor 120 according to an embodiment may compare the first ratio information with the second ratio information to compare the ratio of the texture block included in the input image 10 with the ratio of the texture block included in the noise-removed image 20, and then identify the corresponding input image 10 as the upscaled image in case that a change in the ratio is equal to or more than the threshold value.

Figure 7:
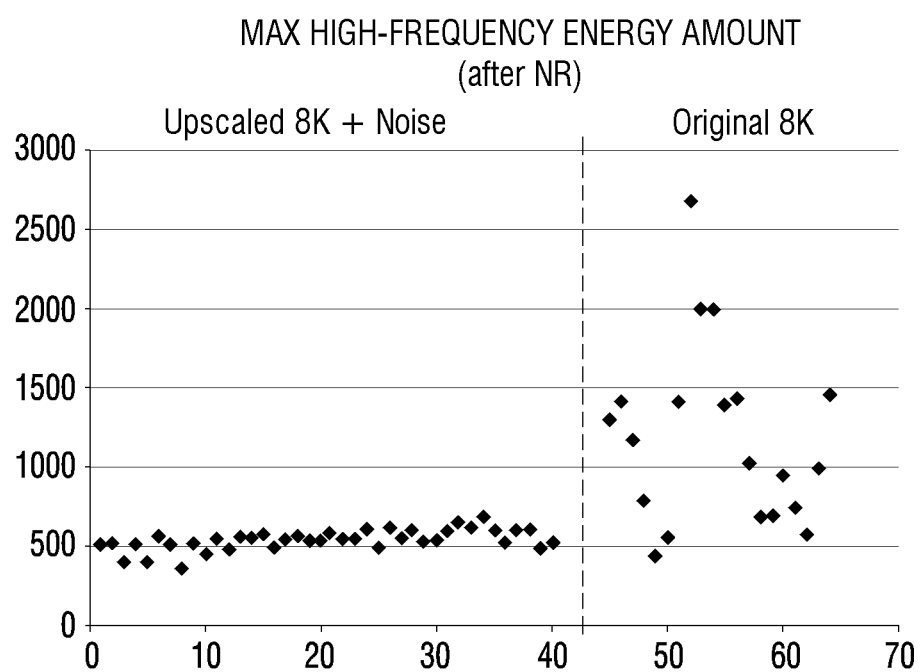
FIG. 7 is a diagram for describing maximum energy amount according to an embodiment of the disclosure.

In addition, the processor 120 according to an embodiment of the disclosure may identify whether the input image 10 is the upscaled image based on the third information indicating the maximum energy amount among the energy amount of each of the plurality of second pixel blocks included in the noise-removed image 20. FIG. 7 is a diagram for describing maximum energy amount according to an embodiment of the disclosure.

Referring to FIG. 7, 400 to 700 may be the maximum energy amount corresponding to the noise-removed image 20 obtained by performing the noise removal processing on the upscaled image. To the contrary, 400 to 3000 may be the maximum energy amount corresponding to the noise-removed image 20 obtained by performing the noise removal processing on the high-resolution original image, and there are many cases in which the maximum energy amount is more than 1000. Accordingly, the processor 120 may identify the input image 10 as the upscaled image based on the third information in case that the maximum energy amount is less than the experimentally obtained threshold value.

Referring to FIG. 2, the processor 120 according to an embodiment of the disclosure may obtain a feature value of the noise-removed image 20 corresponding to the input image 10 based on the difference between the first and second ratio information, the second ratio information and the third information. For example, the processor 120 may obtain the feature value by respectively normalizing the difference between the first and second ratio information, the second ratio information and the third information and then applying a different weight to each of the normalized values.

$$F = w1 \times v1 + w2 \times v2 + w3 \times v3 \quad \text{[Equation 1]}$$

Here, F indicates a feature value; v1 indicates a value obtained by normalizing the difference between the first and second ratio information from 0 to 100; w1 indicates a first weight; v2 indicates a value obtained by normalizing the second ratio information from 0 to 100; w2 indicates a second weight; v3 indicates a value obtained by normalizing the maximum energy amount based on the third information from 0 to 100; and w3 indicates a third weight.

Meanwhile, a greater difference between the first and second ratio information indicates that the input image 10 is the upscaled image, and a smaller second ratio information and a smaller third information indicate that the input image 10 is the upscaled image. Accordingly, the processor 120 according to an embodiment may perform a reverse in the process of obtaining the value v1 obtained by normalizing the difference between the first and second ratio information from 0 to 100. The processor 120 according to an embodiment may identify whether the input image 10 is the upscaled image based on whether the feature value F is more than the threshold value. For example, the processor 120 may identify the input image 10 as the original image with a threshold resolution or higher in case that the feature value is equal to or more than the threshold value, and may identify the input image 10 as an image with a resolution lower than the threshold resolution but upscaled to the threshold resolution or higher in case that the feature value is less than the threshold value. Here, the threshold resolution may indicate 4K UHD or 8K UHD. However, the threshold resolution is not limited thereto, and the processor 120 may identify only whether the image is upscaled based on the feature value.

The processor 120 according to an embodiment of the disclosure may obtain a metric value indicating the feature of the input image based on the energy information for each of the plurality of first pixel blocks 11 in the first frequency domain signal corresponding to the input image 10.

Figure 8:
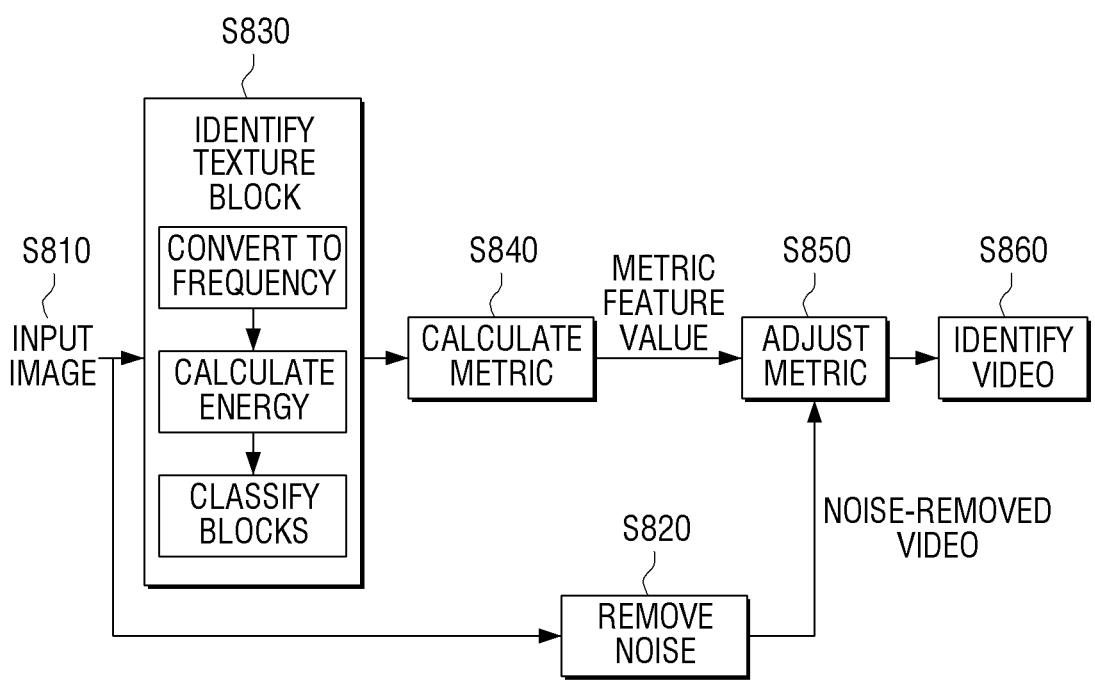
FIG. 8 is a diagram for describing a metric value according to an embodiment of the disclosure.

FIG. 8 is a diagram for describing a metric value according to an embodiment of the disclosure.

Referring to FIG. 8, in case that the image is input (S810), the processor 120 according to an embodiment of the disclosure may obtain the noise-removed image by performing noise removal processing on the input image 10 (S820).

In addition, the processor 120 may convert the input image 10 to the first frequency domain signal and obtain first information based on the energy information for each of the plurality of first pixel blocks 11 in the first frequency domain signal (S830). For example, the processor 120 may identify, as the texture block, a pixel block having more high-frequency energy amount than low-frequency energy amount among the plurality of first pixel blocks 11. That is, the processor 120 may identify whether each of the plurality of first pixel blocks 11 corresponds to a texture region (or the texture block) by classifying the plurality of blocks.

Subsequently, the processor 120 may obtain the metric value indicating the feature of the input image 10 (S840). Here, the metric value may refer to a ratio of energy amount of a high-frequency band to total energy amount of the input image 10. For example, the processor 120 may obtain the total energy amount of the input image 10 based on the first frequency domain signal. Subsequently, the processor 120 may identify the texture block included in the input image 10 based on the first information, and obtain a sum of energy amount corresponding to the identified texture blocks among the plurality of first pixel blocks 11. Subsequently, the processor 120 may identify the ratio of the energy amount corresponding to the texture block to the total energy amount.

$$M = \frac{\sum_{N=1} E_H(N)}{E_T} \quad \text{[Equation 2]}$$

Here, M indicates the metric value;

$$\sum_{N=1} E_H(N)$$

indicates the sum of energy amount of the texture blocks among the plurality of first pixel blocks 11; and $E_T$ indicates the total energy amount of the input image 10.

The processor 120 according to an embodiment may obtain the metric value of the input image 10, i.e. a ratio of the high-frequency energy amount to the total energy amount of the input image 10, in Equation 2. Subsequently, the processor 120 may identify whether the input image 10 is the upscaled image based on the metric value. For example, the processor 120 may identify the input image 10 as the high-resolution original image in case that the metric value is equal to or more than a first threshold value, and may identify the input image 10 as the upscaled image in case that the metric value is less than the first threshold value. Here, the first threshold value is the experimentally obtained value, and may be variously changed based on an experimental result, a manufacturer's setting, a user's setting, etc.

According to another example, the processor 120 may adjust the metric value based on the first to third information (S850). For example, the processor 120 may increase the metric value in case that the feature value F of the noise-removed image 20 obtained based on Equation 1 is equal to or more than a second threshold value, and decrease the metric value in case that the feature value F is less than the second threshold value. According to an embodiment, the processor 120 may identify whether the input image 10 is the upscaled image only based on the feature value F without considering the metric value; and according to another embodiment, the processor 120 may identify whether the input image 10 is the upscaled image based on a metric value adjusted based on the feature value F (S860). Meanwhile, the second threshold value may be variously changed based on a plurality of image-based experimental results, the manufacturer's setting, the user's setting, etc.

Figure 9:
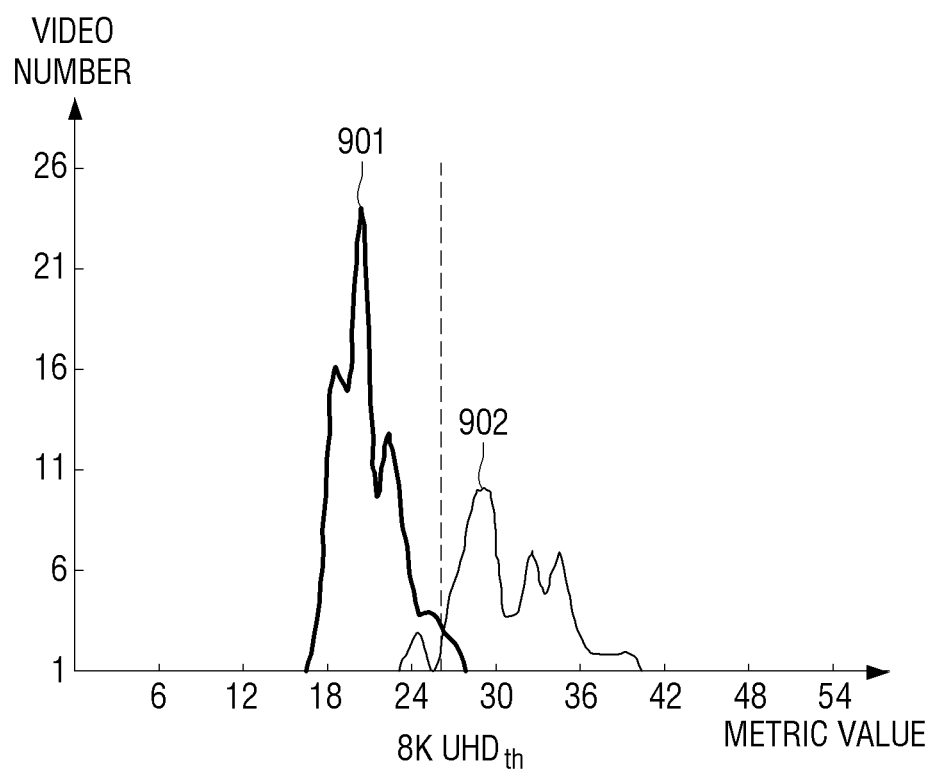
FIG. 9 is a diagram for describing a threshold resolution according to an embodiment of the disclosure.

FIG. 9 is a diagram for describing a threshold resolution according to an embodiment of the disclosure.

Referring to FIG. 9, the processor 120 may identify whether the input image 10 is an original image with a threshold resolution or higher, or an image with a resolution lower than the threshold resolution but upscaled to the threshold resolution or higher based on a threshold metric value (or the first threshold value) identifying whether the input image 10 is the upscaled image. For example, the processor 120 may identify whether the metric value corresponding to the input image 10 is equal to or more than the threshold metric value obtained based on the plurality of image-based experimental results.

The processor 120 according to an embodiment of the disclosure may increase the metric value in case that the feature value F obtained based on the noise-removed image 20 is equal to or more than the second threshold value. As the metric value is increased, there may be a higher probability in which the processor 120 identifies the input image 10 as the original image with the threshold resolution or higher. According to another example, the processor 120 may decrease the metric value in case that the feature value F obtained based on the noise-removed image 20 is less than the second threshold value. As the metric value is decreased, there may be a higher probability in which the processor 120 identifies the input image 10 as the image with the resolution lower than the threshold resolution but upscaled to the threshold resolution or higher. As the processor 120 identifies both the metric value and the feature value F, there may be an increased accuracy of the identification result for the input image 10. Here, the threshold resolution may indicate 4K UHD or 8K UHD, but is not limited thereto.

Meanwhile, the processor 120 according to an embodiment of the disclosure may perform different image processing on the input image 10 based on an identification result. For example, in case that the input image 10 is the upscaled image, the processor 120 may increase noise removal intensity or apply an additional noise removal filter. In addition, the processor 120 may perform edge enhancement processing on the input image 10.

According to another example, in case that the input image 10 is the high-resolution original image, the processor 120 may decrease the noise removal intensity or may not apply the additional noise removal filter. In addition, the processor 120 may perform texture enhancement processing on the input image 10. This example is an embodiment, and the processor 120 may apply or may not apply various image processing methods to the input image 10 based on the identification result. For example, the processor 120 may bypass the input image 10 and output the input image 10 through a display.

Figure 10:
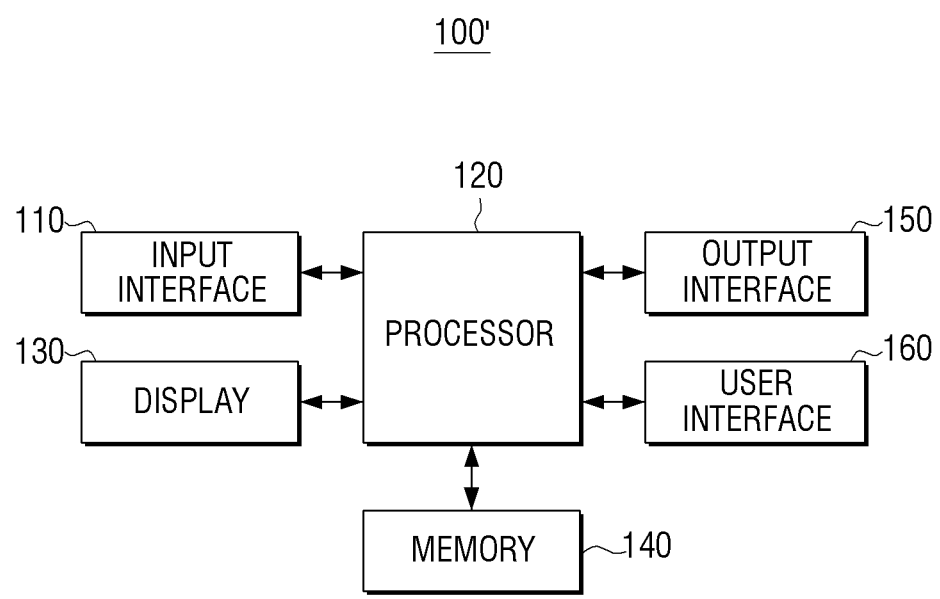
FIG. 10 is a block diagram illustrating a detailed configuration of the electronic device illustrated in FIG. 2.

FIG. 10 is a block diagram illustrating a detailed configuration of the electronic device illustrated in FIG. 2.

According to FIG. 10, the electronic device 100 may include the input interface 110, the processor 120, a display 130, a memory 140 and an output circuit 150. In the description of FIG. 10, omitted is a detailed description for components overlapped with the components illustrated in FIG. 2.

The display 130 may be implemented in various forms such as a liquid crystal display (LCD), an organic light-emitting diode (OLED), a light-emitting diode (LED), a micro LED, a quantum dot light-emitting diode (QLED), a liquid crystal on silicon (LCoS), a digital light processing (DLP), a quantum dot (QD) display panel, etc. In particular, the processor 120 according to an embodiment of the disclosure may perform different image processing on the input image 10 based on the input image 10 or the identification result of the input image 10, and then may control the display 130 to display an image-processed final image. For example, the processor 120 may apply a first image processing method to the input image 10 in case that the input image is the upscaled image, and apply a second image processing method in case that the input image is not the upscaled image. Subsequently, the processor 120 may control the display 130 to display the input image which is image-processed based on the identification result.

The memory 140 may be electrically connected to the processor 120 and store data necessary for various embodiments of the disclosure. For example, the memory 140 may be implemented as an internal memory such as a read-only memory (ROM such as electrically erasable programmable read-only memory (EEPROM)), a random access memory (RAM) or the like, which is included in the processor 120, or may be implemented as a memory separate from the processor 120.

The memory 140 may be implemented in a form of a memory embedded in the electronic device 100 or a form of a memory attachable to and detachable from the electronic device 100, depending on a data storing purpose. For example, data for driving the electronic device 100 may be stored in the memory embedded in the electronic device 100; and data for an extension function of the electronic device 100 may be stored in the memory attachable to and detachable from the electronic device 100. In case of being implemented as the memory embedded in the electronic device 100, the memory may include at least one of a volatile memory (e.g., a dynamic random access memory (DRAM), a static RAM (SRAM), a synchronous dynamic RAM (SDRAM), etc.), a non-volatile memory (e.g., a one time programmable read-only memory (OTPROM), a programmable ROM (PROM), an erasable and programmable ROM (EPROM) and an electrically erasable and programmable ROM (EEPROM)), a mask ROM, a flash ROM, etc.), a flash memory (e.g., a NAND flash, a NOR flash, etc.), a hard drive and a solid state drive (SSD).

In case of being implemented as the memory attachable to and detachable from the electronic device 100, the memory 140 may include a memory card (e.g., a compact flash (CF), a secure digital (SD), a micro secure digital (Micro-SD), a mini secure digital (Mini-SD), an extreme digital (xD), a multi-media card (MMC), etc.), or an external memory (e.g., a universal serial bus (USB) memory) that can be connected to a USB port.

According to an embodiment, the memory 140 may store at least one instruction executed by the processor 120. Here, the instruction may be an instruction for allowing the processor 120 to identify whether the input image 10 is the upscaled image and obtain the identification result.

According to an embodiment of the disclosure, the memory 140 may be implemented as a single memory storing data generated in various operations according to the disclosure.

The output circuit 150 may output a sound signal.

For example, the output circuit 150 may convert a digital sound signal processed by the processor 120 to an analog sound signal and then amplify and output the sound signal. For example, the output circuit 150 may include at least one speaker unit, a digital-to-analogue (D/A) converter, an audio amplifier, etc., which may output at least one channel. According to an embodiment, the output circuit 150 may be implemented to output various multi-channel sound signals. In this case, the processor 120 may control the output circuit 150 to perform enhancement processing and output the sound signal input to correspond to the enhancement processing of the input image. For example, the processor 120 may convert an input two-channel sound signal to a virtual multi-channel (e.g., a 5.1 channel) sound signal; identify a location where an electronic device 100' is positioned and convert the input two-channel sound signal to a space-optimized stereoscopic signal; or provide an optimized sound signal based on a type of the input image (e.g., a content genre). A user interface 160 may be implemented as a device such as a button, a touch pad, a mouse or a keyboard, or may be implemented as a touch screen, a remote control receiver or the like, which may perform the above-described display function and operation input function together. A remote control transceiver may receive a remote control signal from an external remote control device or transmit a remote control signal through at least one communication manner among infrared communication, Bluetooth communication and Wi-Fi communication.

Figure 11:
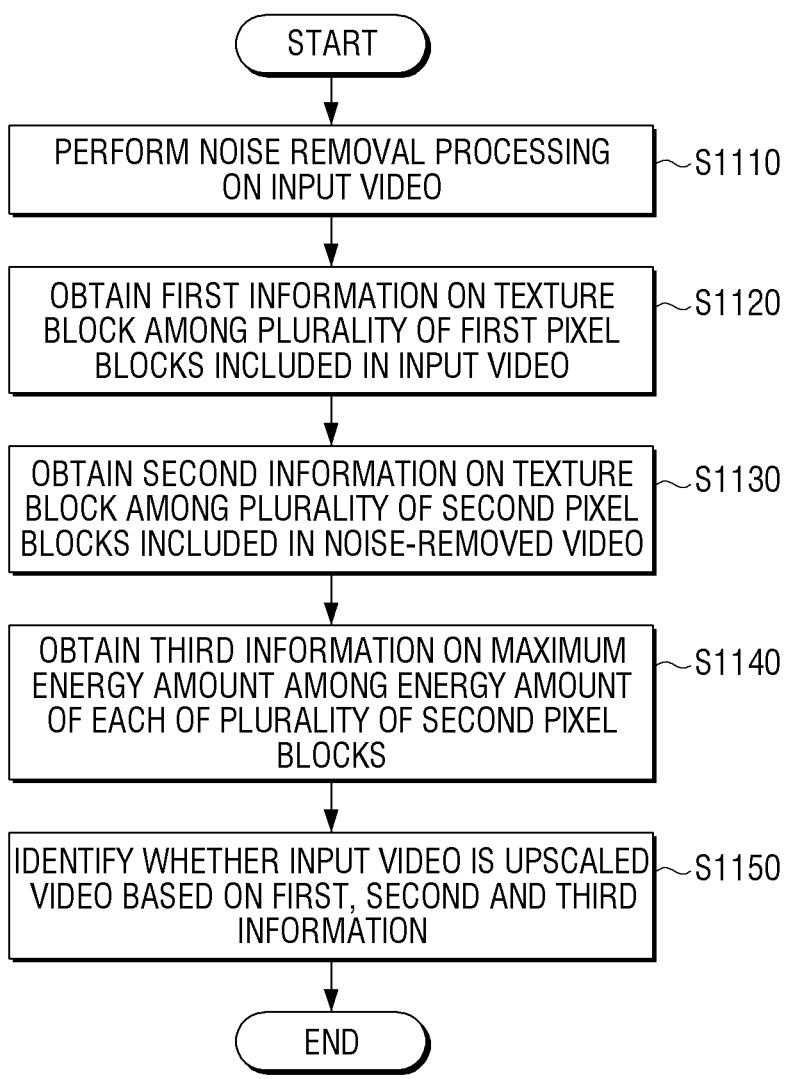
FIG. 11 is a flow chart for describing a control method according to an embodiment of the disclosure.

FIG. 11 is a flow chart for describing a control method according to an embodiment of the disclosure.

The control method illustrated in FIG. 11 may include performing noise removal processing on an input image (S1110).

Subsequently, the control method may include obtaining first information on a texture block among a plurality of first pixel blocks included in the input image (S1120).

Subsequently, the control method may include obtaining second information on a texture block among a plurality of second pixel blocks included in a noise-removed image (S1130).

Subsequently, the control method may include obtaining third information on maximum energy amount among energy amount of each of the plurality of second pixel blocks (S1140).

Next, the control method may include identifying whether the input image is an upscaled image based on the first, second and third information (S1150).

Here, the identifying (S1150) may include: obtaining first ratio information on the texture block among the plurality of first pixel blocks included in the input image based on the first information; obtaining second ratio information on the texture block among the plurality of second pixel blocks included in the noise-removed image based on the second information; and identifying whether the input image is the upscaled image based on a difference between the first and second ratio information, the second ratio information and the third information.

In addition, the obtaining of the first information (S1120) may include converting the input image to a first frequency domain signal and obtaining the first information based on energy information for each of the plurality of first pixel blocks in the first frequency domain signal; the obtaining of the second information (S1130) may include converting the noise-removed image to a second frequency domain signal and obtaining the second information based on energy information for each of the plurality of second pixel blocks in the second frequency domain signal; and the obtaining of the third information (S1140) may include obtaining the energy amount corresponding to each of the plurality of second pixel blocks by summing up energy amount of frequency bands each having a value equal to or more than a threshold value for each of the plurality of second pixel blocks in the second frequency domain signal.

The control method according to an embodiment of the disclosure may further include obtaining a metric value indicating a feature of the input image based on the energy information for each of the plurality of first pixel blocks in the first frequency domain signal, wherein the identifying (S1150) may include: adjusting the metric value based on the first to third information; and identifying whether the input image is the upscaled image by comparing the adjusted metric value with a first threshold value.

Here, the obtaining of the metric value may include: identifying the texture block among the plurality of first pixel blocks based on the energy information for each of the plurality of first pixel blocks in the first frequency domain signal; and obtaining the metric value indicating the feature of the input image based on energy information on the identified texture block.

The control method according to an embodiment of the disclosure may further include: obtaining the first ratio information on the texture block among the plurality of pixel blocks included in the input image based on the first information; and obtaining the second ratio information on the texture block among the plurality of pixel blocks included in the noise-removed image based on the second information, wherein the identifying (S1150) may include: obtaining a feature value of the noise-removed image based on the difference between the first and second ratio information, the second ratio information and the third information; and increasing the metric value in case that the obtained feature value is equal to or more than a second threshold value and decreasing the metric value in case that the obtained feature value is less than the second threshold value.

Here, in the obtaining of the feature value, the feature value may be obtained by respectively normalizing the difference between the first and second ratio information, the second ratio information and the third information and then applying a different weight to each of the normalized values.

In addition, in the identifying (S1150), it may be identified whether the input image is an original image with a threshold resolution or higher, or an image with a resolution lower than the threshold resolution but upscaled to the threshold resolution or higher.

In addition, the control method according to an embodiment may further include performing different image processing based on whether the input image is the upscaled image. In addition, the control method may further include displaying the image-processed input image.

However, such various embodiments of the disclosure may be applied not only to the electronic device but also to all electronic devices capable of image processing, such as an image receiving device including a set-top box, an image processing device, etc.

Meanwhile, the diverse embodiments of the disclosure described above may be implemented in a computer or a computer readable recording medium using software, hardware, or a combination of software and hardware. In some cases, the embodiments described in the disclosure may be implemented by the processor 120 itself. According to a software implementation, embodiments such as procedures and functions described in the disclosure may be implemented by separate software modules. Each of the software modules may perform one or more functions and operations described in the disclosure.

Meanwhile, computer instructions for performing processing operations of the electronic device 100 based on the diverse embodiments of the disclosure described above may be stored in a non-transitory computer-readable medium. The computer instructions stored in the non-transitory computer-readable medium may allow a specific device to perform the processing operations of the electronic device 100 according to the diverse embodiments described above if based on they are executed by a processor of the specific device.

The non-transitory computer-readable medium is not a medium that stores data for a while, such as a register, a cache, a memory or the like, but refers to a medium that semi-permanently stores data and is readable by the device. A specific example of the non-transitory computer-readable medium may include a compact disk (CD), a digital versatile disk (DVD), a hard disk, a Blu-ray disk, a universal serial bus (USB), a memory card, a read-only memory (ROM) or the like.

Although embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. An electronic device comprising:
an input interface comprising a circuit; and
a processor configured to:
convert an input image input through the input interface to a first frequency domain signal,
based on first energy information for each of a plurality of first pixel blocks included in the input image in the first frequency domain signal, obtain first information indicating whether each of the plurality of first pixel blocks is a texture block,
obtain first ratio information of the texture block among the plurality of first pixel blocks based on the first information,
perform noise removal processing on the image input,
convert the noise-removed image to a second frequency domain signal,
based on second energy information for each of a plurality of second pixel blocks included in the noise-removed image in the second frequency domain signal, obtain second information indicating whether each of the plurality of second pixel blocks is the texture block,
obtain second ratio information of the texture block among the plurality of second pixel blocks based on the second information,
obtain energy amount corresponding to each of the plurality of second pixel blocks by summing up energy amount of frequency bands having a value equal to or more than a first threshold value in the second frequency domain signal,
obtain third information on maximum energy amount, among energy amount of each of the plurality of second pixel blocks, and
identify whether the input image is an upscaled image based on a difference between the first ratio information and second ratio information, the second ratio information and the third information.

2. The electronic device as claimed in claim 1, wherein the processor is further configured to:
identify, based on the first energy information for each of the plurality of first pixel blocks in the first frequency domain signal, the texture block among the plurality of first pixel blocks,
based on the first energy information on the identified texture block, obtain a metric value indicating a feature of the input image,
adjust the metric value based on the first information, the second information and the third information and
identify whether the input image is the upscaled image by comparing the adjusted metric value with a second threshold value.

3. The electronic device as claimed in claim 2, wherein the processor is further configured to:
obtain a feature value of the noise-removed image based on the difference between the first and second ratio information, the second ratio information and the third information and
increase the metric value based on the obtained feature value being equal to or greater than a second threshold value and decrease the metric value based on the obtained feature value being less than the second threshold value.

4. The electronic device as claimed in claim 3, wherein the processor is further configured to:
obtain the feature value by respectively normalizing the difference between the first and second ratio information, the second ratio information and the third information, and
apply a different weight to each of the normalized values.

5. The electronic device as claimed in claim 1, wherein the processor is further configured to identify whether the input image is an original image with a threshold resolution or higher, or an image with a resolution lower than the threshold resolution but upscaled to the threshold resolution or higher.

6. The electronic device as claimed in claim 1, wherein the processor is configured to perform image processing based on whether the input image is the upscaled image.

7. The electronic device as claimed in claim 6, further comprising a display, wherein the processor is configured to control the display to display the image-processed input image.

8. A control method of an electronic device, comprising:

converting an input image to a first frequency domain signal;

obtaining, based on first energy information for each of a plurality of first pixel blocks included in the input image in the first frequency domain signal, first information indicating whether each of the plurality of first pixel blocks is a texture block;

obtaining first ratio information of the texture block among the plurality of first pixel blocks based on the first information;

performing noise removal processing on the input image;

converting the noise-removed image to a second frequency domain signal;

obtaining, based on second energy information for each of a plurality of second pixel blocks included in the noise-removed image in the second frequency domain signal, second information indicating whether each of the plurality of second pixel blocks is the texture block;

obtaining second ratio information of the texture block among the plurality of second pixel blocks based on the second information;

obtaining energy amount corresponding to each of the plurality of second pixel blocks by summing up energy amount of frequency bands having a value equal to or more than a first threshold value in the second frequency domain signal;

obtaining third information on maximum energy amount among energy amount of each of the plurality of second pixel blocks; and identifying whether the input image is an upscaled image based on a difference between the first ratio information and second ratio information, the second ratio information and the third information.

9. The control method as claimed in claim 8, further comprising:

identifying, based on the first energy information for each of the plurality of first pixel blocks in the first frequency domain signal, the texture block among the plurality of first pixel blocks, and obtaining, based on the first energy information on the identified texture block, a metric value indicating a feature of the input image, wherein the identifying whether the input image is the upscaled image comprises:

adjusting the metric value based on the first information, the second information and the third information; and identifying whether the input image is the upscaled image by comparing the adjusted metric value with a second threshold value.

10. The control method as claimed in claim 9, further comprising:

wherein the identifying whether the input image is the upscaled image includes:

obtaining a feature value of the noise-removed image based on the difference between the first and second ratio information, the second ratio information and the third information; and increasing the metric value based on the obtained feature value being equal to or greater than a second threshold value and decrease the metric value based on the obtained feature value being less than the second threshold value.

11. The control method as claimed in claim 10, wherein in the obtaining of the feature value, the feature value is obtained by respectively normalizing the difference between the first and second ratio information, the second ratio information and the third information and applying a different weight to each of the normalized values.

12. The control method as claimed in claim 8, wherein the identifying whether the input image is the upscaled image further comprises identifying whether the input image is an original image with a threshold resolution or higher, or an image with a resolution lower than the threshold resolution but upscaled to the threshold resolution or higher.

13. The control method as claimed in claim 8, further comprising performing image processing based on whether the input image is the upscaled image.

14. The control method as claimed in claim 13, further comprising displaying the image-processed input image.

* * * * *